(12) United States Patent
Ishihara et al.

(10) Patent No.: US 7,738,754 B2
(45) Date of Patent: Jun. 15, 2010

(54) OPTICAL COMPONENT AND BACKLIGHT UNIT USING THE OPTICAL COMPONENT

(75) Inventors: Seiichi Ishihara, Ibaraki (JP); Takashi Okada, Tokyo (JP)

(73) Assignees: Sakari Co., Ltd., Ibaraki (JP); LTec Trading Co., Ltd., Tokyo (JP)

( * ) Notice: Subject to any disclaimer, the term of this patent is extended or adjusted under 35 U.S.C. 154(b) by 389 days.

(21) Appl. No.: 11/547,936

(22) PCT Filed: Jul. 16, 2004

(86) PCT No.: PCT/JP2004/010190

§ 371 (c)(1),
(2), (4) Date: Mar. 6, 2007

(87) PCT Pub. No.: WO2005/101065

PCT Pub. Date: Oct. 27, 2005

(65) Prior Publication Data

US 2007/0285941 A1    Dec. 13, 2007

(30) Foreign Application Priority Data

Apr. 9, 2004  (JP) .............................. 2004-114948
Apr. 22, 2004 (JP) .............................. 2004-126895

(51) Int. Cl.
*G02B 6/10* (2006.01)
(52) U.S. Cl. ....................... 385/129; 385/901
(58) Field of Classification Search ............... 385/31, 385/33, 129, 130, 131, 901, 14
See application file for complete search history.

(56) References Cited

U.S. PATENT DOCUMENTS 6,517,914 B1   2/2003   Hiraishi

FOREIGN PATENT DOCUMENTS

| JP | 04-009804   | 1/1992  |
|----|-------------|---------|
| JP | 05-088168   | 4/1993  |
| JP | 02-000017   | 1/1999  |
| JP | 2000-280267 | 10/2000 |
| JP | 2001-004813 | 1/2001  |
| JP | 2001-124909 | 5/2001  |
| JP | 2001-228338 | 8/2001  |
| JP | 2002-107510 | 4/2002  |
| JP | 2003-29030  | 1/2003  |
| JP | 2004-87234  | 3/2004  |
| JP | 2004-111384 | 4/2004  |

*Primary Examiner*—John A Ward
(74) *Attorney, Agent, or Firm*—William L. Androlia; H. Henry Koda

(57) ABSTRACT

An optical component having an incident surface and a light exiting surface wherein where a collimated light is incident on the incident surface, the light intensity of the outgoing light from the light exiting surface is anisotropic along an azimuth angle of 30° to the normal and a ratio of the maximum intensity value and the minimum intensity value is 1.2 or more and a plurality of irregular lens rows are aligned on one of the incident surface and the light exiting surface to form an angle within a range of −30° to +30° on the incident surface or light exiting surface.

4 Claims, 4 Drawing Sheets

OPTICAL COMPONENT AND BACKLIGHT UNIT USING THE OPTICAL COMPONENT

BACKGROUND OF THE INVENTION

1. Field of the Invention

The present invention relates to an optical component and a backlight unit using the optical component. In particular, the present invention relates to an optical sheet suitable for use in an image display device, such as a backlight unit of a liquid crystal display device, a projector screen, or a plasma display, and a backlight unit using the optical sheet.

2. Description of the Related Art

Conventionally, technology for controlling light has been applied in various fields and has become a useful part of our lives. In particular, screens that are large, as well as having high-definition, high-luminance, and high-quality, are being developed for image display devices.

Various optical components are implemented for the purpose of enhancing the luminance, widening the viewing angle, and improving the screen quality of the backlight unit of liquid crystal display devices, plasma displays, and projector screens, which are image display devices.

For example, an edge light system or a direct-type system is used in the backlight unit of liquid crystal display devices. In each system, an optical sheet is frequently used to improve the screen quality.

In other words, a prism sheet and a diffusion sheet are used as the optical components on a light-exiting surface of a light-guiding board in the edge-light-system backlight unit. The prism sheet enhances the luminance. The diffusion sheet widens the viewing angle and diminishes flaws. A reflective sheet is used as the optical component on the back surface of the light-exiting surface of the light-guiding board.

Similarly, in the direct-type-system backlight unit, the reflective sheet, the diffusion sheet and, in some cases, the prism sheet are used as the optical components.

Among such various optical components, the diffusion sheet plays the most effective role in enhancing the luminance, widening the viewing angle, and improving the screen quality.

In the conventional diffusion sheet, the surface is given a rough, crimped texture, beads are mixed in with the binder and applied to a plastic sheet, or light diffusion materials are embedded within the sheet.

In such a diffusion sheet, light transmittance and diffusion are inversely related. It cannot yet be said that an effective use of light has been sufficiently achieved.

Figure 6:
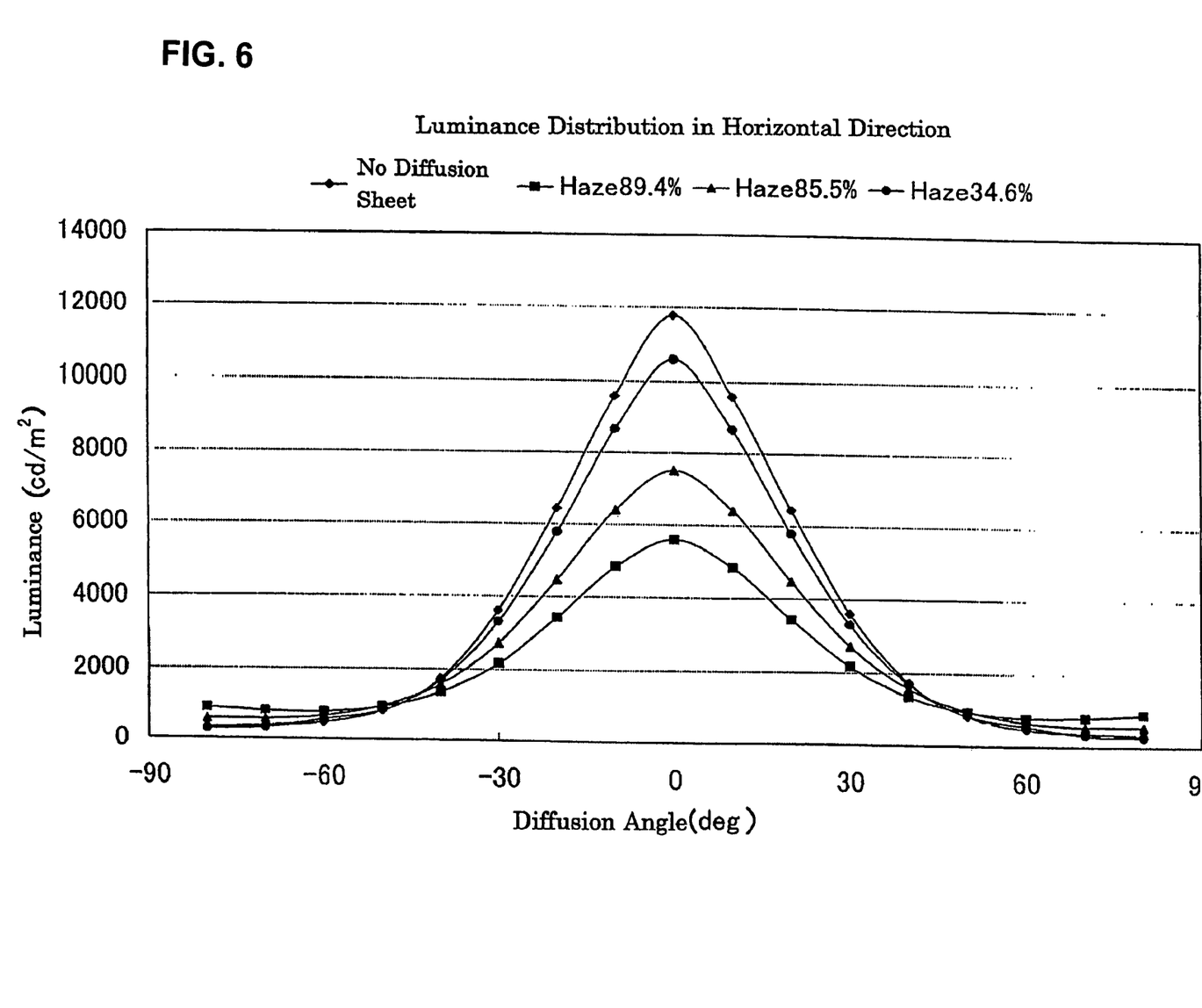
FIG. 6 is a graph showing a relationship between diffraction angles and luminance in a typical optical sheet.

FIG. 6 shows a relationship between diffusion angles and the luminance in a typical diffusion sheet in the backlight unit of a liquid crystal display device.

Although there are differences depending on the type of light-guiding board in the backlight unit, as shown in FIG. 6, when the haze of the diffusion sheet is increased, only the peak luminance decreases and the diffusion angle is not widened.

This phenomenon can be seen in many conventional diffusion sheets. In such diffusion sheets, even a small widening of the diffusion angle causes a significant amount of reduction in the luminance because light is isotropically diffused.

On the other hand, the diffusion angle, namely the viewing angle, is required to be narrowed to increase the luminance.

In light of such issues, a following diffusion sheet is disclosed in the invention described in Patent Literature 1 (Japanese Patent Unexamined Publication 2001-4813). In the diffusion sheet, a transparent base material includes a large amount of fine, spherical air bubbles. The shape of the air bubbles is a spheroid.

The diffusion sheet described in Patent Literature 1 aims to increase diffusion in a required direction by causing anisotropy in the diffusion direction. The object of the diffusion sheet is to suppress the reduction in luminance.

An anisotropic dispersion film having elliptical micropores is also disclosed in the invention described in Patent Literature 2 (Japanese Patent Unexamined Publication 2003-29030).

However, sufficient diffusion and anisotropy cannot be attained from the spheroidal air bubbles. There are also problems such as difficulty in controlling the dispersion of the air bubbles.

In addition, other than diffusion sheets, an optical component that is applied to the backlight in an edge-light-system backlight unit is disclosed in the invention described in Patent Literature 3 (Japanese Patent Unexamined Publication Heisei 2-17).

In the invention described in Patent Literature 3, a lens unit is formed on the light-exiting surface of the light-guiding board. A prism sheet, on to which a prism row is formed, is disposed so that the prism row faces the light-guiding board side.

According to an invention such as that described in Patent Literature 3, light is outputted in a diagonal direction by the lens unit formed on the light-guiding board. The prism sheet makes the outgoing light face the front, thereby acquiring a light that has high luminance.

However, in the invention described in Patent Literature 3, the lens unit formed on the light-guiding board has a regular structure. Therefore, the light is concentrated and, as a result, there is a disadvantage in that the viewing angle is narrowed.

Furthermore, in an invention described in Patent Literature 4 (Japanese Patent Unexamined Publication Heisei 4-9804), a formation of linear bumps on the light-guiding board is disclosed. The directions of a majority of the linear bumps are perpendicular to the incident surface.

According to the invention described in Patent Literature 4, the linear bumps have a lens effect. Therefore, the light spreading in a direction parallel to the light incident surface is concentrated, thereby acquiring high luminance.

However, in the invention described in Patent Literature 4, the linear bumps face the traveling direction of the light within the light-guiding board. Therefore, high light-exit efficiency is not developed and the acquired luminance is not very high.

Because a person gazes at the screen of the liquid crystal display device, even the slightest flaw becomes annoying. One flaw, among the flaws, that is considered to be particularly difficult to improve is the development of a luminescent line and a band-shaped light section and dark section near the incident end of the light-guiding board.

To solve this problem, for example, the following is disclosed in an invention described in Patent Literature 5 (Japanese Patent Unexamined Publication Heisei 5-88168). A process to roughen the surface of the incident surface of the light-guiding board is performed, and the incident light is diffused. As a result, the development of the luminescent line and the band-shaped light section and dark section is reduced.

However, there is a problem with the invention described in Patent Literature 5 in that the vicinity of the incident end becomes too bright with foreign light.

[Patent Literature 1] Japanese Patent Unexamined Publication 2001-4813

[Patent Literature 2] Japanese Patent Unexamined Publication 2003-290301

[Patent Literature 3] Japanese Patent Unexamined Publication Heisei 2-17

[Patent Literature 4] Japanese Patent Unexamined Publication Heisei 4-9804

[Patent Literature 5] Japanese Patent Unexamined Publication Heisei 5-88168

SUMMARY OF THE INVENTION

In recent years, the demands are rising for further enhancement in the luminance and improvement in the quality of image. At the same time, as described above, problems occur in that the viewing angle becomes narrow and flaws in the screen become noticeable when the luminance is increased.

Therefore, in order to effectively solve these problems and provide a high-quality image having high-luminance, a wide viewing angle, and inconspicuous flaws, a means that is more effective than the means described in the above-described Patent Literatures 1 to 5 is needed.

The present invention has been achieved in light of the aforementioned issues. An object of the present invention is to provide the following optical component and a backlight unit using the optical component. The optical component can maintain a high luminance, widen the viewing angle, and diminish flaws in the display.

In order to achieve the aforementioned object, the optical component according to a first aspect of the present invention has an incident surface and a light-exiting surface. Light is incident on the incident surface. The light-exiting surface is roughly parallel to the incident surface. When a roughly collimated light is incident on the incident surface, the light intensity of the outgoing light from the light-exiting surface is anisotropic along an azimuth angle of 30° to a normal line of the light-exiting surface. In addition, a ratio of a maximum intensity value and a minimum intensity value of the anisotropy (maximum intensity value/minimum intensity value) is 1.2 or more. The maximum intensity value is the highest intensity value in an intensity distribution of the light intensity of the outgoing beam along the azimuth angle 30°. The minimum intensity value is the lowest intensity value in the intensity distribution of the light intensity of the outgoing beam along the azimuth angle 30°.

According to such a configuration, the diffusion of light in a target direction can be suitably increased, and the diffusion in other directions can be suitably suppressed.

In the optical component according to another aspect of the invention, a plurality of irregular lens rows are aligned on at least one of the incident surface and the light-exiting surface. The lens rows extend on the incident surface or the light-exiting surface in a direction forming an angle within a range of −30° to 30° to one direction along the incident surface or the light-exiting surface.

According to such a configuration, a favorable anisotropic diffusion light can be acquired by the irregular lens rows.

In the optical component according to still another aspect of the invention, in the plurality of irregular lens rows extending on the incident surface or the light-exiting surface in a direction forming an angle within a range of −30° to 30° to one direction along the incident surface or the light-exiting surface, the one direction differs depending on the lens rows being aligned on the incident surface and the lens rows being aligned on the light-exiting surface.

According to such a configuration, a more favorable anisotropic diffusion light can be acquired because the array direction of the lens rows differs with the incident surface and the light-exiting surface.

In the optical component according to still another aspect of the invention, the plurality of irregular lens rows are random and nonconsecutive, convex or concave prism rows having a roughly triangular cross-section. The apex angles of the lens rows differ within a range of 30° to 175°, the pitches differ within a range of 0.1 µm to 100 µm, and the lengths differ within a range of 1 µm to 1000 µm.

According to such a configuration, the anisotropic diffusion light can be acquired with further certainty because the lens rows are random and nonconsecutive prism rows.

In the optical component according to still another aspect of the invention, an arc-shaped curved surface having a radius of 0.5 µm to 500 µm is formed on the apex angle section of the prism rows having the roughly triangular cross-section.

According to such a configuration, transfer performed when an optical sheet is formed is improved, and flaws such as scratches made during assembly can be reduced.

In the optical component according to still another aspect of the invention, the optical component is an optical sheet disposed so as to face the light-exiting surface of a light-guiding board in a backlight unit.

According to such a configuration, a favorable anisotropic diffusion light can be acquired by the optical sheet serving as the optical component.

In the optical component according to still another aspect of the invention, the optical component is the light-guiding board in the backlight unit.

According to such a configuration, a favorable anisotropic diffusion light can be acquired by the light-guiding board serving as the optical component.

In the optical component according to still another aspect of the invention, the optical sheet has at least one of a diffusion sheet and a prism sheet.

According to such a configuration, a more favorable anisotropic diffusion light can be acquired by the optical sheet.

The backlight unit according to an aspect of the invention includes a light source, a light-guiding board, an optical sheet, and a reflective sheet. The light-guiding board includes at least one of an incident surface facing the light source and a light-exiting surface perpendicular to the incident surface. The optical sheet is disposed facing the light-exiting surface of the light-guiding board. The reflective sheet is disposed on the back surface of the light-exiting surface of the light-guiding board. The light-guiding board includes a light-exiting mechanism and an anisotropic diffusion mechanism. The light-exiting mechanism makes the angle of the light diffused throughout the light-guiding board from the light source, via the incident surface, a critical angle or less. The anisotropic diffusion mechanism anisotropically diffuses the light at the critical angle or less, along the azimuth angle direction to the normal line of the light-exiting surface. Then, the anisotropic diffusion mechanism outputs the light from the light-guiding board.

According to such a configuration, the exit-efficiency from the light-exiting surface of the light incident on the incident surface of the light-guiding board can be improved by the light-exiting mechanism. Furthermore, the light incident on the incident surface of the light-guiding board can be outputted from the light-exiting surface by the anisotropic diffusion mechanism, as a favorable anisotropic diffusion light.

In the backlight unit according to another aspect of the invention, the light-exiting mechanism is a plurality of lens rows aligned on the back surface of the light-exiting surface and extending roughly parallel to a length direction of the incident surface.

According to such a configuration, light can be efficiently outputted from the light-guiding board.

In the backlight unit according to still another aspect of the invention, the plurality of lens rows in the light-exiting mechanism are convex or concave prism rows having a roughly triangular cross-section. The apex angles of the prism rows are 80° to 175°.

According to such a configuration, the light within the light-guiding board can be efficiently outputted by a fixed percentage and at a fixed direction because of the fixed gradient of the prism rows.

In the backlight unit according to still another aspect of the invention, a ratio of luminance in the direction parallel to the length direction of the incident surface, along an azimuth angle 30° to the normal line of the light-exiting surface, and luminance in the direction perpendicular to the length direction of the incident surface is 1.2 or more in the anisotropic diffusion.

According to such a configuration, the development of the luminescent line and the band-shaped light section and dark section near the incident end of the light-guiding board can be suppressed.

In the backlight unit according to still another aspect of the invention, the anisotropic diffusion mechanism is a plurality of irregular lens rows aligned on the light-exiting surface and extending in a direction forming an angle within the range of −30° to 30° to a perpendicular line perpendicular to the incident surface.

According to such a configuration, a more favorable anisotropic diffusion light can be acquired by the irregular lens rows.

In the backlight unit according to still another aspect of the invention, the plurality of irregular lens rows in the anisotropic diffusion mechanism are random and nonconsecutive, convex or concave prism rows having a roughly triangular cross-section. The apex angles of the prism rows differ within a range of 30° to 175°, the pitches differ within a range of 0.1 µm to 100 µm, and the lengths differ within a range of 1 µm to 100 µm.

According to such a configuration, a more favorable anisotropic diffusion light can be acquired because the irregular lens rows are random, nonconsecutive prism rows.

In the backlight unit according to still another aspect of the invention, the density of the prism rows in the anisotropic diffusion mechanism is changed.

According to such a configuration, anisotropic diffusion efficiency can be changed within the surfaces of the light-guiding board, and the desired anisotropic diffusion light can be acquired.

In the backlight unit according to still another aspect of the invention, the density of the prism row is formed to sequentially increase from the center of the light-exiting surface, along the length direction of the incident surface.

According to such a configuration, the decrease in the luminance of the side-edge surfaces perpendicular to a light-entering surface of the backlight unit can be suppressed.

In the backlight unit according to still another aspect of the invention, an arc-shaped curved surface having a radius of 0.5 µm to 500 µm is formed on the apex angle section of the prism rows having the roughly triangular cross-section in the anisotropic diffusion mechanism.

According to such a configuration, transfer performed when the light-guiding board is injection-molded is enhanced, and flaws such as scratches made during the assembly of the backlight unit can be reduced.

EFFECT OF THE INVENTION

In the optical sheet according to the present invention, the diffusion of light in a target direction can be suitably increased, and the diffusion in other directions can be suitably suppressed. As a result, a high-quality image having high-luminance, a wide viewing angle, and inconspicuous flaws can be acquired.

Furthermore, in the optical sheet according to the present invention, a favorable anisotropic diffusion light can be acquired by the irregular lens rows. As a result, a higher quality image can be acquired.

Still further, in the optical sheet according to the present invention, a more favorable anisotropic diffusion light can be acquired by the array direction of the lens rows differing with the incident surface and the light-exiting surface. As a result, a higher quality image can be acquired.

Still further, in the optical sheet according to the present invention, the anisotropic diffusion light can be acquired with further certainty because the lens rows are random and non-consecutive prism rows. As a result, a higher quality image can be acquired.

Still further, in the optical sheet according to the present invention, transfer performed when an optical sheet is formed is improved, and flaws such as scratches made during assembly can be reduced. As a result, a higher quality image can be acquired.

Still further, in the optical sheet according to the present invention, a favorable anisotropic diffusion light can be acquired by the optical sheet serving as the optical component. As a result, a higher quality image can be acquired.

Still further, in the optical sheet according to the present invention, a favorable anisotropic diffusion light can be acquired by the light-guiding board serving as the optical component. As a result, a higher quality image can be acquired.

Still further, in the optical sheet according to the present invention, a more favorable anisotropic diffusion light can be acquired by the optical sheet. As a result, a higher quality image can be acquired.

In the backlight unit according to the present invention, the exit-efficiency from the light-exiting surface of the light incident on the incident surface of the light-guiding board can be improved by the light-exiting mechanism. Furthermore, the light incident on the incident surface of the light-guiding board can be outputted from the light-exiting surface as a favorable anisotropic diffusion light by the anisotropic diffusion mechanism. As a result, high-luminance can be developed, and a high-quality image having a wide viewing angle and inconspicuous flaws can be acquired.

Furthermore, in the backlight unit according to the present invention, the light can be efficiently outputted from the light-guiding board. As a result, a higher luminance can be acquired while maintaining a wide viewing angle and diminishing flaws.

Still further, in the backlight unit according to the present invention, light within the light-guiding board can be efficiently outputted by a fixed percentage and at a fixed direction, because of the fixed gradient of the prism rows. As a result, a higher quality image having a higher luminance and inconspicuous flaws can be acquired, while maintaining a wide viewing angle.

Still further, in the backlight unit according to the present invention, the development of the luminescent line and the band-shaped light section and dark section near the incident end of the light-guiding board can be suppressed. As a result, a higher quality image with inconspicuous flaws can be acquired.

Still further, in the backlight unit according to the present invention, a more favorable anisotropic diffusion light can be acquired by the irregular lens rows. As a result, a higher quality image can be acquired.

Still further, in the backlight unit according to the present invention, a more favorable anisotropic diffusion light can be acquired because the irregular lens rows are random, nonconsecutive prism rows. As a result, a higher quality image can be acquired.

Still further, in the backlight unit according to the present invention, the anisotropic diffusion efficiency can be changed within the surfaces of the light-guiding board, and the desired anisotropic diffusion light can be acquired. As a result, a higher quality image can be acquired.

Still further, in the backlight unit according to the present invention, the decrease in the luminance of the side-edge surfaces perpendicular to a light-entering surface of the backlight unit can be suppressed. As a result, a higher quality image can be acquired.

Still further, in the backlight unit according to the present invention, transfer performed when the light-guiding board is injection-molded is enhanced. In addition, flaws such as scratches made during the assembly of the backlight unit can be reduced. As a result, a higher quality image can be acquired.

DETAILED DESCRIPTION OF THE PREFERRED EMBODIMENT

An embodiment of the optical component according to the present invention will be described hereinafter with reference to FIG. 1 and FIG. 2.

Figure 1:
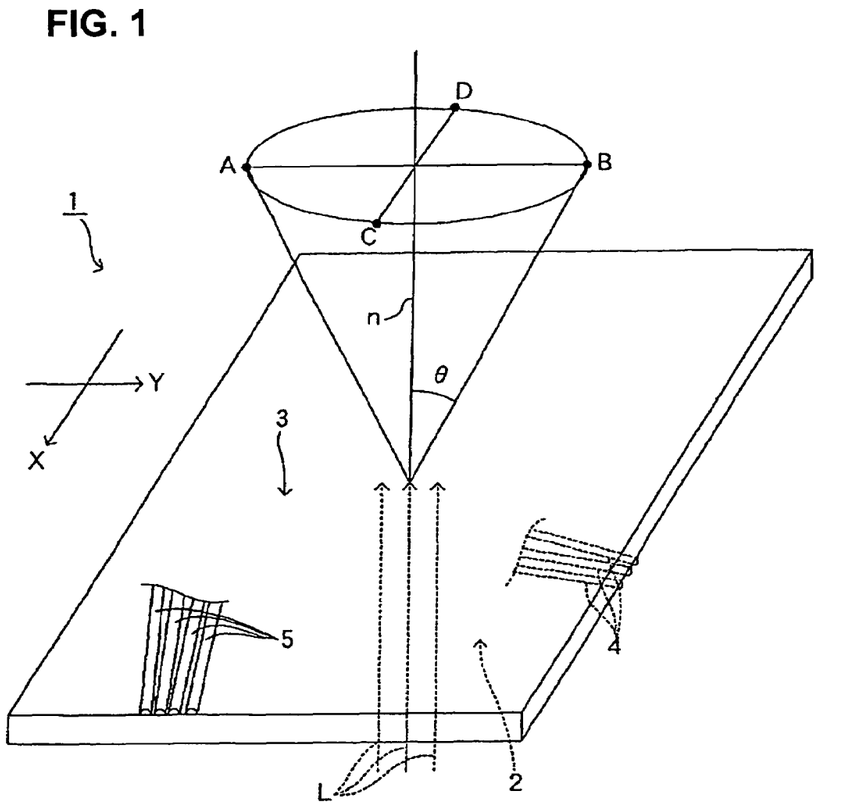
FIG. 1 is a perspective view schematically showing an anisotropic diffusion in an optical component according to an embodiment of the present invention.

As shown in FIG. 1, an optical component 1 according to the present embodiment has an incident surface 2 and a light-exiting surface 3. Light is incident on the incident surface 2. The light-exiting surface 3 is roughly parallel to the incident surface 2. The optical component 1 diffuses the roughly collimated light L that is incident on the incident surface and outputs the light L from the light-exiting surface 3.

The roughly collimated light is a light beam that does not spread more than 10% over the size of the light source (the diameter, if the light source is circular) at a distance of 50 cm from the light source. In order to acquire the collimated light, lenses can be combined using point light sources. Alternatively, a laser beam or the like can be used.

In the optical component 1 according to the present embodiment, when the roughly collimated light is incident on the incident surface 2, the light intensity of the outgoing light from the light-exiting surface 3 is anisotropic along the azimuth angle θ=30° to the normal line n of the light-exiting surface 3, shown in FIG. 1.

Furthermore, the ratio of the maximum intensity value and the minimum intensity value of the anisotropy (maximum intensity value/minimum intensity value) is 1.2 or more (preferably 1.5 or more; more preferably 2.0 or more). The maximum intensity value is the highest intensity value in the intensity distribution of the light intensity of the outgoing beam along the azimuth angle 30°. The minimum intensity value is the lowest intensity value in the intensity distribution of the light intensity of the outgoing beam along the azimuth angle 30°.

As shown in FIG. 1, when the line segment O-A (long axis) and the line segment O-C (short axis) extending in the azimuth angle direction are assumed to be the light intensity of the outgoing light in the azimuth angle direction, the ratio of the maximum intensity value and the minimum intensity value of the anisotropy (maximum intensity value/minimum intensity value) is synonymous to the ratio of the line segment O-A and the line segment O-C (long axis/short axis).

If the ratio of the maximum intensity value and the minimum intensity value of the intensity distribution is 1.2 or more, the optical component 1 in which the light diffusion increases in the target direction and the diffusion is suppressed in the other directions is acquired. As a result, the reduction of luminance in the image display device is small, and a screen with a wide viewing range can be acquired.

The azimuth angle is merely set to 30°, as described above, as a representative angle for observing the liquid crystal display from an angle, to quantitatively specify the anisotropic diffusion in the optical component 1 according to the present embodiment.

Therefore, with regards to azimuth angles differing from 30°, the preferred value of the ratio of the maximum intensity value and the minimum intensity value of the optical component 1 may differ from the above-mentioned value (1.2 or more).

Generally, the light intensity distribution is measured depending on the brightness. However, when the azimuth angle is the same, as described above, comparison can be made by the measurement of luminance.

Figure 2:
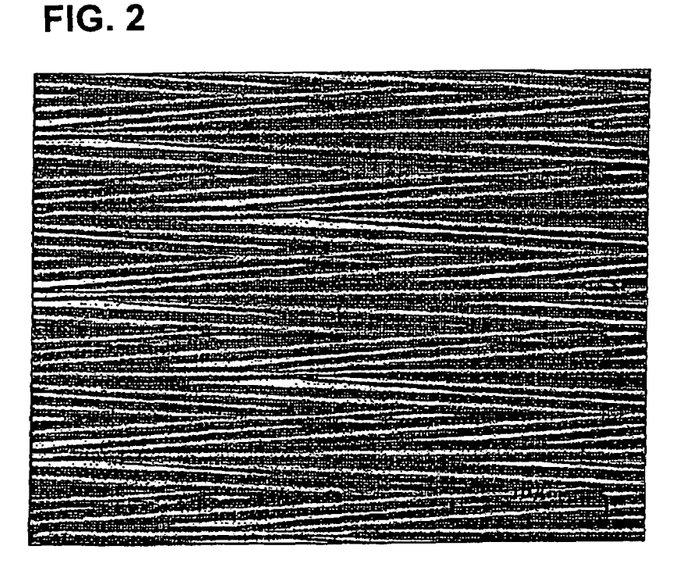
FIG. 2 is a planar view showing lens rows in the optical component according to the embodiment of the present invention.

Furthermore, as shown in FIG. 1 and FIG. 2, the optical component 1 according to the present embodiment has a plurality of irregular lens rows 4 and 5 on at least one of the incident surface 2 and the light-exiting surface 3 (both of the incident surface 2 and the light-exiting surface 3, in FIG. 1).

The lens rows 4 and 5 on the incident surface 2 or the light-exiting surface 3 extend along the incident surface 2 or the light-exiting surface 3, in a direction forming an angle within the range of −30° to 30° (preferable −20° to 20°) to one direction.

In FIG. 1, the plurality of irregular lens rows 4 formed on the incident surface 2 each form an irregular angle within the range of −30° to 30° (preferable −20° to 20°) to the length direction (X axis direction) of the incident surface 2.

The plurality of irregular lens rows 5 formed on the light-exiting surface 3 each form an irregular angle within the range of −30° to 30° (preferable −20° to 20°) to the direction perpendicular to the length direction (Y axis direction) of the light-exiting surface 3.

Furthermore, according to the present embodiment, the plurality of irregular lens rows 4 and 5 are random and nonconsecutive, convex or concave prism rows having a roughly triangular cross-section. The apex angles differ within a range of 30° to 175°. The pitches differ within a range of 0.1 m to 100 μm, and the lengths differ within a range of 1 μm to 1000 μm.

Figure 3:
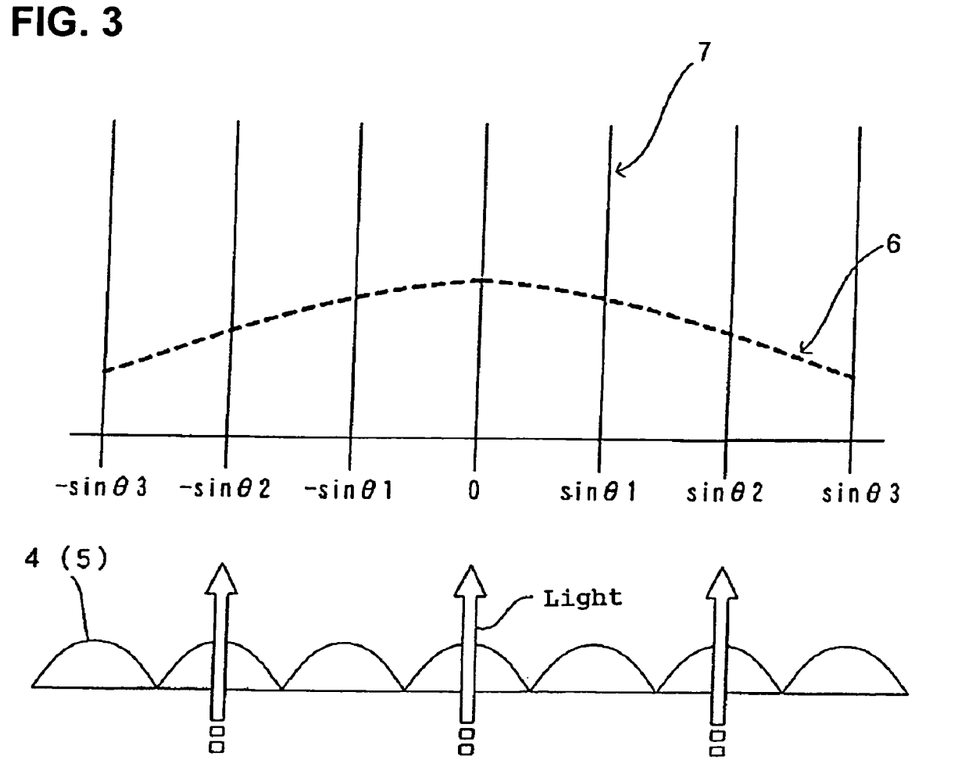
FIG. 3 is an explanatory diagram showing a spread of diffracted light in the optical component according to the embodiment of the present invention.

Here, FIG. 3 shows a spreading of diffracted light 6 when there is one amplitude object and the spreading of diffracted light 7 when there are countless numbers of amplitude objects, periodically.

According to the diffraction theory, light is diffracted in a cross-sectional direction to the amplitude object. The diffraction angle θ is expressed by $\sin\theta\, m = m \cdot \lambda/p$. However, p is the pitch of the oscillator. λ is the wavelength. M is an integer 0, ±1, ±2, . . . and indicates the order of the diffraction.

When the amplitude objects are few and irregular, the diffracted light spreads in the cross-sectional direction of the oscillator, and the diffracted intensity tends to decrease. At the same time, when the amplitude objects are numerous and random, the diffracted light tends to widely spread in the cross-sectional direction of the amplitude objects.

Therefore, according to the present invention, as described above, the lens rows 4 and 5, which are the amplitude objects, are formed from random and nonconsecutive prism rows having a rough triangular cross-section extending in a direction forming an angle within the range of −30° to 30° to one direction along the incident surface 2 or the light-exiting surface 3. Therefore, the light incident on the optical component 1 is diffracted in a direction forming an angle between −30° to 30° to a direction perpendicular to the one direction.

In addition, as described above, the prism rows are random and nonconsecutive. The apex angles differ with irregularity within the range of 30° to 175°. The pitches differ with irregularity within a range of 0.1 μm to 100 μm, and the lengths of the prism edges differ with irregularity within a range of 11 m to 1000 μm. Therefore, diffracted light that is spread wider can be acquired.

Therefore, in the prism rows according to the present embodiment, the diffraction order of the outgoing light and the like can no longer be discerned. As a result, anisotropic diffusion light that is suitable as the outgoing light can be acquired.

In addition, as described above, because the extension direction of both lens rows 4 and 5 mutually differ, a more suitable anisotropic diffusion light can be acquired.

The pitch of the prism row can be about several tens of micrometers. In this case, although the light acts geometric-optically, it can easily be known by ray tracing that the light spreads in the similar direction.

In addition, as described above, the following reason is given, in addition to acquiring a diffracted light that is widely spread, as the reason for forming the pitch of the prism rows according to the present embodiment irregularly, within the range of 0.1 μm to 100 μm.

In other words, when the pitch of the prism row is 0.1 μm or less, processing becomes difficult. Therefore, costs increase and the repeatability of the processing becomes poor. At the same time, when the pitch of the prism row is 100 μm or more, the diffusion is insufficient and the pitch may be visually recognized.

The pitch of the prism row is more preferably within a range of 0.5 μm to 20 μm.

Furthermore, as described above, the following reason is given, in addition to acquiring a diffracted light that is widely spread, as the reason for irregularly selecting the apex angles of the prisms in the prism rows from within the range of 30° to 175°.

In other words, in the diffraction theory, the diffraction efficiency becomes higher as the ratio of the pitch and the height increases. However, in the optical component 1 according to the present embodiment, when the apex angle of the prism is less than 30° and the optical component 1 is used in combination with other components, such as an optical sheet, the other components become easily damaged. At the same time, when the apex angle of the prism is 175° or more, the diffusion efficiency decreases.

The apex angles of the prisms in the prism rows are more preferably within the range of 80° to 120°.

Furthermore, only an angle to the bottom section that is equivalent to the apex angle is required to be secured for the top section of the prism row. The top section of the prism row can, for example, have a curved surface because sufficient anisotropic diffusion performance can be acquired, even with the curved surface.

In this case, the curved surface is preferably an arc-shaped curved surface having a radius of between 0.5 μm to 500 μm. With such a curved surface, transfer performed when the component 1 is formed is facilitated. In addition, flaws such as scratches made during assembly can be reduced.

In addition to the above-described configuration, the density of the prism rows in the optical component 1 can be changed depending on the location on the light-exiting surface.

To increase the density of the prism rows, the percentage of narrow pitches in the above-described pitch of the prism rows is increased within the range of 0.1 μm to 100 μm. The percentage of acute angles in the apex angles of the prisms is increased within the range of 30° to 175°. Furthermore, the percentage of short lengths in the lengths of the prism rows is increased within the range of 1 μm to 1000 μm.

As a result, the anisotropic diffusion efficiency can be changed within the surface of the optical component 1, and the desired anisotropic diffusion light can be acquired.

In addition, generally, the screen edges of the image display screen tend to have low luminance. Therefore, the changes in the density of the prism rows are effective in improving the low luminance and achieving a high-quality image display device.

In this case, the density of the prism rows is preferably changed so as to be sequentially increased from the center of the light-exiting surface, along the length direction of the incident surface.

Furthermore, according to the present embodiment, the base material of the optical component 1 can include synthetic resin having high light-transmittance. In this case, the thickness of the base material is preferably 0.01 mm to 10 mm. When the base material is thinner than 0.0 mm, molding becomes difficult and the base material becomes difficult to handle. At the same time, when the base material is thicker than 10 mm, the image display device becomes thick and heavy.

In addition, when the optical component 1 is used as an optical sheet that is installed in the edge-light-system backlight unit of the liquid crystal display device, the thickness of the optical component 1 is preferably 0.08 mm to 0.3 mm. At the same time, when the optical component 1 is used as a diffusion sheet in the direct-type system liquid crystal display device, the thickness of the optical component 1 is more preferably 0.5 mm to 3 mm.

Furthermore, as a synthetic resin used in the base material for the optical component 1, methacrylate resin, acrylic resin, polycarbonate resin, polyester resin, vinyl chloride resin, and the like are given as examples.

In particular, the methacrylate resin is superior in light transmittance and formability. The methacrylate resin is more suitable as the synthetic resin used in the base material of the optical sheet.

As such a methacrylate resin, resin having methyl methacrylate as the main ingredient in which methyl methacrylate is 80% by weight or more is preferred.

The optical component is not limited to the above-described configuration. For example, the optical component can be formed by the lens rows being aligned along the light-exiting surface of a base material. The base material includes a diffusing agent within a light-transmitting sheet and on the surface layer of the light-exiting surface. One flat surface of the light-transmitting sheet is the light-exiting surface.

In addition, the optical component can be formed by the lens rows being aligned on a board-shaped base material formed by a lamination of layers having different refractive indexes.

Furthermore, the optical component can be formed by the lens rows being aligned on a sheet in which a cavity having a lens effect is formed.

Still further, the optical component can be formed by a nonconsecutive, random structure being provided within the light-transmitting, board-shaped base material and on the surface layer of the light-exiting surface, in place of the prism rows. The nonconsecutive, random structure is, for example, a notched structure, a hairline structure, a rectangular diffraction grating structure, or a refractive index anisotropic structure.

Any means can be used as a structure forming means of the optical component 1, such as a cutting process using a diamond bite, a resist-process using light or thermoset resin, or a casting process for foreign polymers. In addition, the prism rows can be formed by a mold component being heat-pressed into a transparent synthetic resin board. The mold component has a structure formed using the above-mentioned processing means. Alternatively, the prism row can be formed by extrusion molding, injection molding, or the like.

Next, an example of the optical component 1 according to the present invention will be explained.

According to the example, the optical component 1 is applied to the diffusion sheet in the direct-type backlight unit of the liquid crystal display device.

FIRST EXAMPLE

In the present example, a cutting process is performed on a metallic mold surface. The front surface of the metallic mold is a mirror-finished surface. The cutting processing is performed by an alternated use of three types of diamond bites. The respective apex angles of the diamond bites are 45°, 60°, and 75°. All of the diamond bites have an arc-shaped curved surface of which the tip apex section has a radius of 2 μm.

At this time, an NC processing machine is set so as to change the direction of one direction between an angle of −20° and 20° and change the length of the cut from the bite between 10μ and 100μ.

The metallic mold, formed as such, is heat-pressed into a 2 mm-thick acrylic resin board serving as the base material, thereby transferring the shape of the metallic mold to the acrylic resin board.

As a result, a diffusion sheet in which irregular lens rows are formed on the resin board surface is acquired as the optical component.

In addition, in the present example, a direct-type backlight unit frame for the liquid crystal display device is manufactured as follows. A box-shaped frame of 310×65×20 mm is manufactured using a 1 mm-thick aluminum board, as the backlight unit base material. A white reflective sheet is adhered within the frame. Furthermore, four cold-cathode tubes that are Φ2.6 and 280 mm in length are set 12 mm apart in a position at a height of 7 mm within the frame.

The above-described diffusion sheet serving as the optical component is disposed on the direct-type backlight unit frame manufactured as such. In this state, the cold-cathode tubes are lighted with an electric current of 6 mA.

Then, from a position that is directly above by 50 cm, the luminance is measured using the BM-7 luminance meter manufactured by Topcon Corporation.

At this time, as a comparison example, a commercial diffusion sheet (transmission 80% and haze 90%) is placed on the direct-type backlight unit frame and the luminance is measured in the same way as in the example.

The measured results of the luminance of the present example and the comparison example are as shown in Table 1, below.

[Table 1]
Luminance (nit)

Example 1

Comparison Example 1

As shown in Table 1, the diffusion sheet that is the optical component in the present example has a higher luminance than the comparison example. It is clear that the diffusion sheet is optimal for the backlight unit of the liquid crystal display device.

The optical component 1 according to the present invention is not limited to the diffusion sheet. A favorable anisotropic diffusion light can be acquired even when the optical component 1 is used on the light-guiding board or the prism sheet in the backlight unit.

Next, an embodiment of the backlight unit according to the present invention will be explained with reference to FIG. 4 and FIG. 5.

Figure 4:
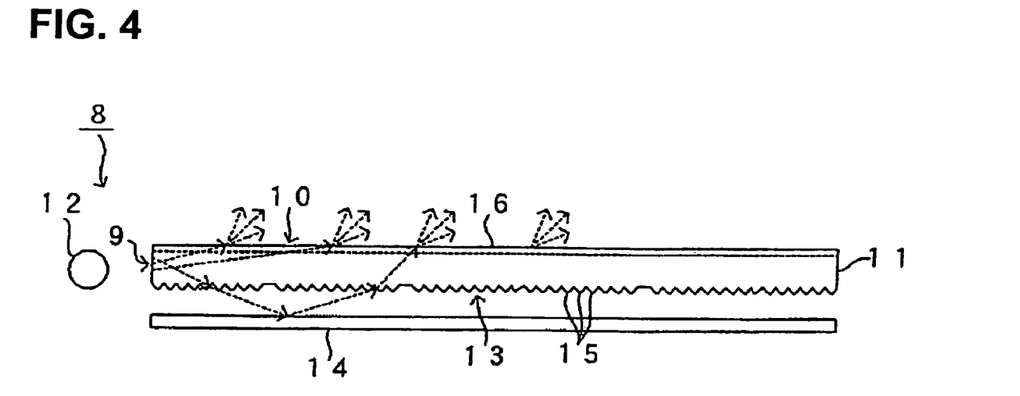
FIG. 4 is a front view schematically showing a backlight unit according to an embodiment of the present invention.

As shown in FIG. 4, a backlight unit 8 according to the present embodiment has a light-guiding board 11 serving as the optical component. The light-guiding board 11 includes an incident surface 9 and a light-exiting surface 10 that is perpendicular to the incident surface 9. A light source 12 is disposed near the incident surface 9 of the light-guiding board 11. A reflective sheet 14 is disposed in a position facing the back surface 13 of the light-exiting surface 10 of the light-guiding board 11.

In the present embodiment, a light-exiting mechanism 15 is mounted on the back surface 13 of the light-exiting surface 10 of the light-guiding board 11. The light-exiting mechanism 15 works to increase the exit-efficiency of the light by making the angle of the light diffused within the light-guiding board 11 to the light-guiding board 11 a critical angle or less. The light is from the light source 12, via the incident surface 9.

The light-exiting mechanism 15 can be configured by, for example, a plurality of lens rows being aligned on the back surface 12 of the light-exiting surface 10 of the light-guiding board 11.

In this way, when the light-exiting mechanism 15 is formed from a plurality of lens rows, it is particularly preferable that each lens row is a convex or concave prism row having a triangular cross-section and extends in the length direction of the incident surface 9 of the light-guiding board 11, as shown in FIG. 1.

In this case, when the light-guiding board 11s acrylic resin, the light from the light source 13 that is incident on the light-guiding board 11 from the incident surface 9 becomes light having a solid angle of approximately ±42° to the normal line of the incident surface 9 in accordance to Snell's Law. The light is diffused throughout the light-guiding board 11.

When the light-exiting surface 10 is perpendicular to the incident surface 9 of the light-guiding board 11, the approximately ±42° light becomes light having an incidence angle of 48° to the light-exiting surface 10. This light is larger than the critical angle (approximately 42°). Therefore, the light is diffused within the light-guiding board 11 by total reflection, without being outputted from the light-exiting surface 10.

At this time, the front surface of the light-guiding board 11 has a gradient such as that of the prism rows. The incidence angle of the light that is near the critical angle changes to the prism gradient depending on the size of the gradient.

As a result, light of which the gradient of the prism is less than the critical angle is outputted from the back surface 10 of the incident surface 9 of the light-guiding board 11.

The direction of even the light that is not less than the critical angle is bent by the gradient of the prism row. Therefore, light that is the critical angle or less is generated by the gradient of the next prism row.

In this way, when there is the prism row gradient, light can be successively outputted from the light-guiding board 11.

Therefore, in the present embodiment, by the use of the prism rows as the light-exiting mechanism 15, light within the light-guiding board 11 can be outputted by a fixed percentage and at a fixed direction, because of the fixed gradient of the prism rows. As a result, the exit-efficiency of light can be further improved, and an outgoing light with higher luminance can be acquired.

Furthermore, in the present embodiment, the apex angles of the prism rows are 80° to 175° (preferably 90° to 170°)

Here, when the apex angle of the prism row is an acute angle of less than 80°, the percentage of light that is the critical angle or less increases, becoming too bright near the light source. Even if the density of the prism rows is made sparse near the light source and denser as the prism rows become farther away from the light source, the distribution of the brightness as the backlight is not improved.

At the same time, when the apex angle of the prism row is more obtuse than 175°, the percentage of outgoing light becomes small and the backlight unit is dark.

Therefore, in the present embodiment, the light within the light-guiding board 11 can be efficiently outputted at a fixed percentage in a fixed direction by the apex angle of the prism row being set to a value within the preferred range.

A configuration other than the foregoing prism row can be used as the light-exiting mechanism 15. For example, on the light-guiding board used in a communication navigation system, white dot-printing is performed on the light-exiting surface or the back surface of the light-exiting surface to output light. Alternatively, bumps are formed on the front surface to output light. Then, the light is outputted. In addition, there is a configuration in which light diffusion particles are dispersed within the light-guiding board, and light is dispersed and outputted outside of the light-guiding board. In the present embodiment, the light-exiting mechanism 15 can be any means as long as the light is efficiently outputted from the light-guiding board 11. For example, the means can be the above-mentioned white-printing, bumps formed on the front surface, a roughened front surface, lens rows, or a thin layer in which light diffusion particles are mixed and dispersed.

Furthermore, the light-exiting mechanism 15 can be configured by any structure. For example, the structure can be a structure in which a diffusion agent is mixed into the interior of the light-guiding board 11 or the front layer of the back surface 13, a structure in which layers having differing refractive indexes are laminated, or a structure in which a cavity having a lens effect is formed.

In addition to the above structures, in the present embodiment, an anisotropic diffusion mechanism 16 is mounted on the light-exiting surface 10 of the light-guiding board 11.

The anisotropic diffusion mechanism 16 performs anisotropic diffusion on the light that is at the critical angle or less to the light-guiding board 11, along the azimuth angle direction to the normal line of the light-exiting surface 10, and outputs the light from the light-exiting surface 10.

As a result, the backlight unit 8 can acquire a favorable anisotropic diffusion light as the outgoing light.

Figure 5:
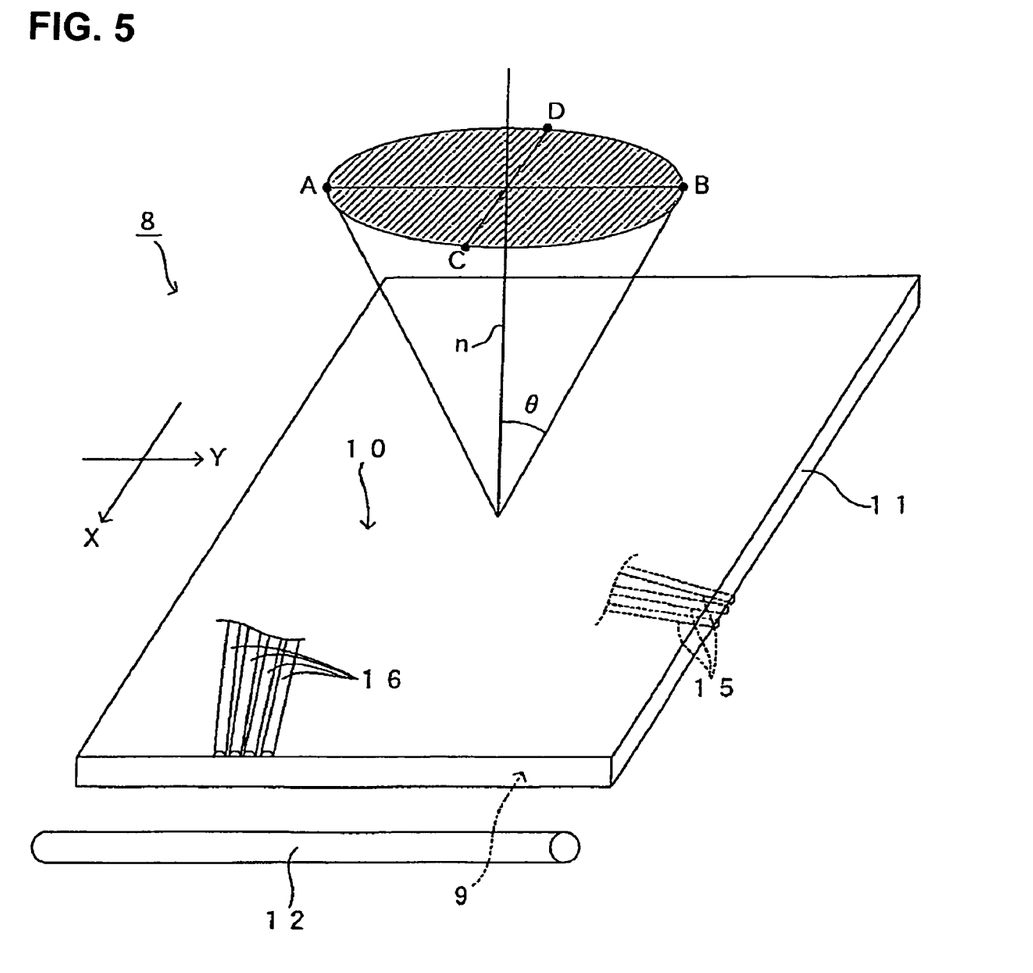
FIG. 5 is a perspective view schematically showing an anisotropic diffusion in the backlight unit according to an embodiment of the present invention.

Next, FIG. 5 schematically shows luminance distribution on a flat surface on the light-exiting surface 10 at a fixed azimuth angle θ, in the vicinity of the normal line n of the light-exiting surface 10 of the light-guiding board 11. As in FIG. 1, the line segments O-A, O-C, and the like correspond to the luminance (outgoing light intensity) in the azimuth angle direction.

The azimuth angle θ is the angle of when the liquid crystal display is observed from an angle. In the present embodiment, the representative angle of the azimuth angle θ is 30°. In addition, the shaded area formed by line segments A-B and C-D is generally quasi-circular.

In the present embodiment, the ratio of the luminance (equivalent to lie segment O-A) in the direction parallel to the length direction (Y axis direction) of the incident surface 9 of the light-guiding board 11 and the luminance (equivalent to lie segment O-B) in the direction (X axis direction) perpendicular to the length direction of the incident surface 9 is 1.2 or more in the anisotropic diffusion by the anisotropic diffusion mechanism 16. In other words, the length of the line segment A-B is 1.2 times the length of the line segment C-D or more (more preferably 2.0).

Preferably, the ratio of the luminance in the direction parallel to the length direction of an incident surface 22 and the luminance in the direction perpendicular to the length direction of the incident surface 22 is 3.0 or more. More preferably, the ratio is 5.0 or more.

In this way, in the present embodiment, because the ratio of the luminance is 1.2 or more (more preferably 2.0), the development of the luminescent line and the band-shaped light section and dark section near the incident end of the light-guiding board can be suppressed.

Furthermore, in the present embodiment, the anisotropic diffusion mechanism 16 includes a plurality of irregular lens rows aligned on the light-exiting surface 10 of the light-guiding board 11. The lens rows extend on the light-exiting surface 10 in a direction forming an angle within the range of −30° to 30° (preferable −20° to 20°) to the perpendicular line in the X axis direction that is perpendicular to the incident surface 9.

Furthermore, the plurality of irregular lens rows are random and nonconsecutive, convex or concave prism rows having a roughly triangular cross-section. The apex angles differ within a range of 30° to 175° (preferably 50° to 170° [more preferably 80° to 120°]). The pitches differ within a range of 0.1 μm to 100 μm, and the lengths differ within a range of 1 μm to 1000 μm.

The configuration is the same configuration as that of the prism row in the above-described optical component 1. Because the anisotropic diffusion mechanism 16 is formed by the plurality of prism rows in this way, a favorable anisotropic diffusion light serving as the outgoing light can be acquired for the same reasons as those of the optical component 1.

Furthermore, the pitches and the apex angles of the prism rows in the anisotropic diffusion mechanism 16 are limited to a suitable range as is in the optical component 1. Therefore, obstacles such as the processing becoming difficult and costs increasing, and other components becoming damaged when the anisotropic diffusion mechanism 16 is used in combination with other components such as the optical sheet are prevented.

The pitch of the prism row can be several tens of micrometers. In this case, although the light acts geometric-optically, the light similarly spreads in a direction roughly parallel to the length direction of the incident surface.

In addition, the apex angles of the prism row scan, for example, be a curved surface, as long as an angle to the bottom section that is equivalent to the apex angle can be secured, as in the optical component 1. In this case, the curved surface is preferably an arc-shaped curved surface with a radius of 0.5 µm to 50 µm, from the perspective of facilitating transfer when injection-molding the light-guiding board 11 and reducing flaws such as scratches made during the assembly of the backlight unit.

Furthermore, as with the optical component 1, the density of the prism rows is preferably changed depending on the location on the light-exiting surface 10 of the light-guiding board 11. In this case, the percentage of narrow pitches in the above-described pitches of the prism rows is increased within the range of 0.1 µm to 100 µm, the percentage of acute angles in the apex angles of the prisms is increased within the range of 50° to 170°, and the percentage of short lengths in the lengths of the prism rows is increased within the range of 1 µm to 500 µm.

In addition, as with the optical component 1, the density of the prism rows is preferably changed so as to be sequentially increased from the center of the light-exiting surface 10, along the length direction of the incident surface 9 (Y axis direction), from the perspective of enhancing the luminance on the side edge surfaces and acquiring a high-quality backlight unit.

Still further, as with the optical component 1, for example, the anisotropic diffusion mechanism can be formed by a notched structure, a hairline structure, a rectangular diffraction grating structure, a refractive index anisotropic structure or the like being provided within the light-guiding board 1 and on the surface layer of the light-exiting surface 10.

Any means can be used to form the light-exiting mechanism 15 and the anisotropic diffusion mechanism 16, such as a cutting processing using a diamond bite, a processing using light or thermoset resin, formation of bumps by a photoresist process, or a casting process for foreign polymers.

Furthermore, the base material of the light-guiding board 11 can include synthetic resin having high light-transmittance. As such synthetic resin, methacrylate resin, acrylic resin, polycarbonate resin, polyester resin, vinyl chloride resin, and the like are given as examples. In particular, the methacrylate resin is suitable from the perspective of light transmission, formability, and the like. As such a methacrylate resin, resin having methyl methacrylate as the main ingredient in which methyl methacrylate is 80% by weight or more is preferred.

In addition, the prism rows on the light-guiding board 11 can be formed by a mold component being heat-pressed into a transparent synthetic resin board. The mold component has a structure formed using the above-mentioned processing means. Alternatively, the prism rows can be simultaneously formed and added by extrusion molding, injection molding, or the like.

In addition to the above-described configuration, in the present embodiment, an optical sheet (not shown) is disposed in a position facing the light-exiting surface 10 on the light-guiding board 11.

At least one of a diffusion sheet and a prism sheet is preferably disposed as the optical sheet. This is for the purpose of providing a backlight unit screen that angles the light outputted in the direction almost perpendicular to the incident surface 9 of the light-guiding board 11 and has a luminance that is optimal for the observation direction.

In other words, the light from the light source 12 is outputted in a direction diagonal to the light-exiting surface 10 while being diffused through the light-guiding board 11. Therefore, generally, the luminance of the backlight unit 8 in the front direction tends to be low and the luminance of the backlight unit 8 in the diagonal direction tends to be high.

Therefore, when only the diffusion sheet is disposed, the outgoing light from the exit surface 10 is relatively close to the front direction. Therefore, the luminance can be enhanced, the viewing angle can be improved, and uniformity of the luminance can be improved. Two diffusion sheets can be layered and used depending on the purpose.

Furthermore, the prism sheet is used when aiming for high-luminance. The prism rows in the prism sheet preferably face the outer side in relation to the light-exiting surface of the light-guiding board. The apex angle of the prism rows is preferably between 80° and 120°. As a result, the light outputted in the diagonal direction is refracted and faces the front, thereby improving in the luminance. Furthermore, two prism sheets in which the prism rows are perpendicular can be used.

At the same time, if the spreading of the outgoing light is small, the prism rows in the prism sheet can face the inner side in relation to the light-guiding board. The apex angles of the prism rows are preferably between 55° and 80°, depending on the direction of the outgoing light from the light-exiting surface. Therefore, the light outputted in the diagonal direction is completely reflected by the prism surface and faces the front as is, thereby acquiring a higher luminance.

The prism sheet and the diffusion sheet can be layered and simultaneously used as well. When the diffusion sheet is used on the outer side of the prism sheet, the diffusion sheet is used as protection against scratches and the like from the outside and as a measure against flaws such as spots of outgoing light from the inside. In addition, when the diffusion sheet is used on the inner side of the prism sheet, the diffusion sheet is used to adjust the incident angle to the prism sheet.

Furthermore, in the present embodiment, a material with a high light-reflectance is used as the reflective sheet 14. Resin, such as polyethylene terephthalate or polypropylene, that has been foamed is preferably used as the material that diffuses and reflects light. Other than the resins, a base material onto which silver, aluminum, or the like has been deposited is preferably used as a material that directly reflects light.

In this case, a backlight unit having a relatively wide viewing angle can be acquired from the material that diffuses and reflects light. A backlight unit having a relatively high luminance can be acquired from the material that performs direct reflection.

In the backlight unit 8 according to the present embodiment configured as described above, the exit-efficiency from the light-exiting surface 10 of the light incident on the incident surface 9 of the light-guiding board 11 can be improved by the light-exiting mechanism 15. Furthermore, the light incident on the incident surface 9 of the light-guiding board 11 can be outputted from the light-exiting surface 10, as a favorable anisotropic diffusion light. As a result, a high-luminance can be developed. Furthermore, a high-quality image having a wide viewing angle and inconspicuous flaws can be acquired.

The present invention is not limited to the above-described embodiments. Various modifications can be made as required.

What is claimed is:

1. An optical component having an incident surface on which light is incident and a light-exiting surface that is roughly parallel to the incident surface, wherein:

when a roughly collimated light is incident on the incident surface, light intensity of an outgoing light from the light-exiting surface is anisotropic along an azimuth angle of 30 to a normal line of the light-exiting surface, and a ratio of a maximum intensity value, which is the highest intensity value in an intensity distribution of the light intensity of the outgoing beam along the azimuth angle 30, and a minimum intensity value, which is the lowest intensity value in the intensity distribution of the light intensity of the outgoing beam along the azimuth angle 30, of the anisotropy (maximum intensity value/minimum intensity value) is 1.2 or more; and a plurality of irregular lens rows are aligned on at least one of the incident surface and the light-exiting surface, extending in a direction forming an angle within a range of −30 to 30 on the incident surface or the light-exiting surface to one direction along the incident surface or the light-exiting surface.

2. The optical component according to claim 1, wherein the one direction differs between a lens row aligned on the incident surface and the lens row aligned on the light-exiting surface.

3. The optical component according to claim 1 or 2, wherein the plurality of irregular lens rows are random and nonconsecutive, convex or concave prism rows having a roughly triangular cross-section in which apex angles thereof differ within a range of 30 to 175, pitches differ within a range of 0.1 m to 100 m, and lengths differ within a range of 1 m to 1000 m.

4. The optical component according to claim 3, wherein an arc-shaped curved surface having a radius of 0.5 m to 500 m is formed on the apex angle section of the prism row having a roughly triangular cross-section.

* * * * *